United States Patent
Maucher et al.

(10) Patent No.: US 7,686,695 B2
(45) Date of Patent: Mar. 30, 2010

(54) COUNTER TRACK JOINT WITH BUILDING SPACE

(75) Inventors: Stephan Maucher, Siegburg (DE);
Wolfgang Hildebrandt, Siegburg (DE);
Anna Gremmelmaier, Sankt Augustin (DE); Ida Hassenrik, Troisdorf (DE)

(73) Assignee: GKN Driveline International GmbH, Lohmar (DE)

( * ) Notice: Subject to any disclaimer, the term of this patent is extended or adjusted under 35 U.S.C. 154(b) by 235 days.

(21) Appl. No.: 10/562,669

(22) PCT Filed: Nov. 2, 2004

(86) PCT No.: PCT/EP2004/012379

§ 371 (c)(1),
(2), (4) Date: Apr. 19, 2007

(87) PCT Pub. No.: WO2006/048031

PCT Pub. Date: May 11, 2006

(65) Prior Publication Data

US 2008/0053735 A1    Mar. 6, 2008

(51) Int. Cl.
*F16D 3/224* (2006.01)
(52) U.S. Cl. ........................ 464/145; 464/906
(58) Field of Classification Search ................ 464/140, 464/145, 906
See application file for complete search history.

(56) References Cited

U.S. PATENT DOCUMENTS

| | | | | |
|---|---|---|---|---|
| 3,475,924 | A | * | 11/1969 | Aucktor .................. 464/145 X |
| 4,177,654 | A | * | 12/1979 | Aucktor ...................... 464/140 |
| 6,379,255 | B1 | * | 4/2002 | Cermak et al. |
| 6,848,999 | B2 | | 2/2005 | Weckerling et al. |
| 2001/0004611 | A1 | * | 6/2001 | Sahashi et al. ............. 464/145 |
| 2001/0006910 | A1 | * | 7/2001 | Krude et al. ................ 464/145 |
| 2003/0008717 | A1 | * | 1/2003 | Welschof |
| 2004/0033837 | A1 | | 2/2004 | Weckerling et al. |
| 2004/0116192 | A1 | | 6/2004 | Krude et al. |

FOREIGN PATENT DOCUMENTS

| | | |
|---|---|---|
| DE | 103 37 612 A1 | 6/2004 |
| EP | 0 802 341 A1 | 10/1997 |

* cited by examiner

*Primary Examiner*—Greg Binda
(74) *Attorney, Agent, or Firm*—Rader, Fishman & Grauer, PLLC

(57) ABSTRACT

A constant velocity joint (11) in the form of a counter track joint wherein, when the joint is in the aligned condition, the ratio (V1) of the pitch circle diameter (PCDS) of the shaft toothing in the inner joint part (15) in the power of three relative to the product of the ball diameter (DK) squared and pitch circle diameter (PCDB) of the balls (17) assumes a value ranging between 0.9 and 1.3.

28 Claims, 9 Drawing Sheets

COUNTER TRACK JOINT WITH BUILDING SPACE

TECHNICAL FIELD

The invention relates to a constant velocity joint in the form of a counter track joint with the following characteristics: an outer joint part having a first longitudinal axis and comprising first outer ball tracks and second outer ball tracks; an inner joint pan having a second longitudinal axis and comprising first inner ball tracks and second inner ball tracks; the first outer ball tracks and the first inner ball tracks form first pairs of tracks; the second outer ball tracks and the second inner ball tacks form second pairs of tracks; the pairs of tracks each accommodate a torque transmitting ball; a ball cage is positioned between the outer joint part and the inner joint part and comprises circumferentially distributed cage windows which each receive at least one of the balls; when the joint is in the aligned condition, the first pairs of tracks open in the central joint plane in a first direction, and when the joint is in the aligned condition, the second pairs of tracks open in the central joint plane in a second direction.

BACKGROUND

Counter track joints of the aforementioned type are basically known from U.S. Publication No. 2004/0033837 A1, wherein joints with 6 balls and with 8 balls are shown. The type of ball tracks here corresponds to the type known from Rzeppa joints (RF joints) and undercut free-joints (UF joints). This means that the center lines of the ball tracks consist of uniform radii (RF joint) or consist of radii and adjacent axially parallel lines (UF joint). In the described counter track joints, the axial opening direction of the pairs of tracks alternates circumferentially, resulting in the type of counter track joint.

Known from DE 103 37 612 A1 are counter track joints in which the track center lines of the first pairs of tracks having an opening angle with an opening direction with aligned joint pointing toward the joint bottom designed in such a way that the opening angle experiences a reversal in its opening direction starting at a specific articulation angle when the joint is articulated. In particular, this is realized by virtue of the fact that the center lines of the ball tracks of the first pairs of tracks are S-shaped, and thereby each exhibit a turning point.

Known inter alia from U.S. Publication No. 2004/116192 A1 are counter track joints in which the center lines of the first ball tracks have a turning point near the joint opening, so that the center lines of the first outer ball tracks are S-shaped. Due to the symmetry condition, the same holds true for the center lines of the first inner ball tracks of the joint inner part. The articulation angle of these counter track joints can be increased in this way.

Joints of the kind mentioned at the outset have been manufactured in various sizes, wherein the geometric conditions were derived from the available ball sizes taking into account the required torque capacity, using standard balls from ball bearing manufacture as the joint balls. In addition, the configuration of known joints has also been determined or influenced by the fitting dimensions of the available intermediate shafts, i.e., in particular the pitch circle diameter of the shaft splines of such intermediate shafts, and must correspond to the pitch circle diameter of the shaft splines in the joint inner part.

SUMMARY OF THE INVENTION

An object of this invention is to create a counter track joint of the kind mentioned at the outset optimized to the building space, which occupies the least possible radial building space at a given torque capacity.

A first solution provides that the ratio ($V1$) between the pitch circle diameter (PCDS) of the shaft splines in the joint inner part to the third power and the product of ball diameter (DK) squared and pitch circle diameter of the balls with aligned joint (PCDB) assumes a value of between 0.9 and 1.3, i.e., $$0.9 < V1 < 1.3 \text{ with } V1 = PCDS^3/(DK^2 \cdot PCDB).$$

In a second solution, the ratio ($V3$) between the pitch circle diameter of the shaft splines in the joint inner part PODS and the OR factor lies between 0.34 and 0.37, wherein the OR factor is defined as the sum of the pitch circle diameter of the balls (PCDB) with aligned joint and the ball diameter (DK), so that $$0.34 < V3 < 0.37 \text{ with } V3 = PCDS/(PCDB+DK).$$

The above approaches are based on postulations that the optimized configuration must have the necessary section modulus of the shaft splines in the joint inner part, and at the same time that the permissible load on the balls may not be exceeded taking into account the Hertz pressure, and finally that the outer diameter of the joint is to be kept low. To this end, the above approaches are used to indicate suitable configuration conditions with which these requirements are satisfied by selecting a large enough pitch circle diameter of the shaft splines and ball diameter, wherein the pitch circle diameter of the balls, being of importance besides the ball diameter for the outer diameter of the joint is designed as low as possible.

Each of the two approaches mentioned leads to the objective on its own. However, the result can be optimized by also using both approaches in combination to further pinpoint the results according to the invention.

One embodiment provides that the ratio ($V2$) between the IR factor and the OR factor measures between 0.525 and 0.585, wherein the IR factor is defined as the difference between the pitch circle diameter of the balls with aligned joint (PCDB) and the ball diameter (DK), and the OR factor is defined as the sum of the pitch circle diameter of the balls with aligned joint PCDB and the ball diameter DK, so that $$0.525 < V2 < 0.585 \text{ with } V2 = (PCDB-DK)/(PCDB+DK).$$

In combination with at least one of the two aforementioned approaches, this dimensioning yields a particularly favorable result.

Another embodiment further provides that the ratio ($V4$) between the pitch circle diameter of the shaft splines in the joint inner part (PCDS) and the IR factor measures between 0.58 and 0.65, wherein the IR factor is defined as the difference between the pitch circle diameter of the balls with aligned joint (PCDB) and the ball diameter (DK), so that $$0.58 < V4 < 0.65 \text{ with } V4 = PCDS/(PCDB-DK).$$

In combination with at least one of the two aforementioned approaches, this dimensioning yields a particularly favorable result.

With respect to the forces on the ball cage and other properties that determine joint function, it has proven favorable to alternate the first pairs of tracks and the second pairs of tracks over the circumference of the joint.

The joint can be designed as a six-ball joint, and in a particularly favorable design, is an eight-ball joint. The joint is configured in a particularly advantageous way, wherein the articulation angle ranges from 25° to 45°, in particular from 30° to 40°. This stipulation means that the balls are still reliably slung in the inner and outer ball tracks within these articulation angle ranges, and that the first balls only start exiting the ball tracks at articulation angles exceeding these ranges.

The joint according to the invention can be designed as a disc joint with unilateral flanging on the joint outer part, or as a monoblock joint, wherein a joint bottom and shaft journal are integrally molded on the joint outer part.

Joints according to the invention can be used for the side shafts of motor vehicles that establish the connection between the differential output and wheel hub. In this case, there is a particularly favorable application as a differential-side fixed joint in such side shafts, which have two fixed joints and a plunging unit in the intermediate shaft.

Joints according to the invention can also be used in longitudinal drive shafts of motor vehicles that comprise at least one fixed joint and a plunging joint or at least two fixed joints and a plunging unit.

Another application involves multi-part longitudinal drive shafts in motor vehicles, which in addition to a fixed joint have at least one intermediate joint and a plunging joint and/or at least one intermediate joint and a longitudinal plunging unit.

BRIEF DESCRIPTION OF THE DRAWINGS

Preferred exemplary embodiments of the invention are shown in the drawings, and will be described below.

FIG. 1 shows a counter track joint according to an embodiment of the invention with six balls, designed as a disc joint:
A) in an axial view; and
B) in a longitudinal section along the B-B line.

FIG. 2 shows a counter track joint according to an embodiment of the invention with eight balls, designed as a disc joint:
A) in an axial view; and
B) in a longitudinal section along the B-B line.

FIG. 3 shows a counter track joint according to an embodiment of the invention with six balls, designed as a monoblock joint:
A) in an axial view;
B) in a longitudinal section along the B-B line; and
C) in a longitudinal section along the C-C line.

FIG. 4 shows a counter track joint according to an embodiment of the invention with eight balls, designed as a monoblock joint:
A) in an axial view;
B) in a longitudinal section along the B-B line; and
C) in a longitudinal section along the C-C line.

DETAILED DESCRIPTION

The two depictions on FIG. 1 wilt be described together below. The universal joint 11 according to the invention is designed as a so-called disc joint. It encompasses a joint outer part 12 with a first opening 13 and a second opening 14. The joint further encompasses a joint inner part 15, a ball cage 16 and torque-conveying balls 17. First outer ball tracks 18 in the joint outer part 12 and first inner ball tracks 19 in the joint inner part 15 accommodate balls $17_1$ and form first pairs of tracks with each other. Second outer ball tracks 20 in the joint outer part 12 and second inner ball tracks 21 in the joint inner part 15 form second pairs of tracks with each other, which accommodate second balls $17_2$. The two types of pairs of tracks (18, 19; 20, 21) are alternately arranged over the circumference. Six pairs of tracks are especially provided. The first pairs of tracks form an opening angle with each other that points in a first direction $R_1$ to the opening 13. The second pairs of tracks form an opening angle with each other that points in a second direction $R_2$ toward the opening 14. A center joint plane E that accommodates the centers P of the balls intersects the longitudinal axis of the joint defined by the longitudinal axes $A_{12}$ of the joint outer part and $A_{15}$ of the joint inner part in a joint center M. The ball cage 16 holds the first balls $17_1$ and second balls $17_2$ in alternating circumferentially distributed cage windows $24_1$, $24_2$. The pitch circle diameter on which the ball centers P lie with the aligned joint is denoted with PCDB. The pitch circle diameter of the insertion opening 27 of the joint inner part 15, which generally has shaft splines not shown here in detail, is denoted with PCDS. The ball diameter is marked DK.

The two depictions on FIG. 2 will be described together below. The universal joint $11_2$ according to the invention is designed as a so-called disc joint. It encompasses a joint outer part $12_2$ with a first opening 13 and a second opening 14. The joint further encompasses a joint inner part $15_2$, a ball cage $16_2$ and torque-conveying balls 17. First outer ball tracks 18 in the joint outer part $12_2$ and first inner ball tracks 19 in the joint inner part $15_2$ accommodate balls $17_1$ and form first pairs of tracks with each other. Second outer ball tracks 20 in the joint outer part $12_2$ and second inner ball tracks 21 in the joint inner part $15_2$ form second pairs of tracks with each other, which accommodate second balls $17_2$. The two types of pairs of tracks (18, 19; 20, 21) are alternately arranged over the circumference. Eight pairs of tracks are especially provided. The first pairs of tracks form an opening angle with each other that points in a first direction $R_1$ to the opening 13. The second pairs of tracks form an opening angle with each other that points in a second direction $R_2$ toward the opening 14. A center joint plane E that accommodates the centers P of the balls intersects the longitudinal axis of the joint defined by the longitudinal axes $A_{12}$ of the joint outer part and $A_{15}$ of the joint inner part in a joint center M. The ball cage $16_2$ holds the first balls $17_1$ and second balls $17_2$ in alternating circumferentially distributed cage windows $24_1$, $24_2$. The pitch circle diameter on which the ball centers P lie with the aligned joint is denoted with PCDB. The pitch circle diameter of the insertion opening 27 of the joint inner part $15_2$, which generally has shaft splines not shown here in detail, is denoted with PCDS. The ball diameter is marked DK. Since two first pairs of tracks (18, 19) are cut in plane A-A, the sectionally depicted pairs of tracks both open in the first direction $R_1$ toward the opening 13.

The individual depictions on FIG. 3 will be described together below. The same details as on FIG. 1 are labeled with the same reference numbers, and modified features are indexed by 100. Reference is made to the corresponding description. Instead of a second opening 14, the joint outer part 112 here has a formed-on bottom 25 followed by a shaft journal 26. The joint otherwise largely corresponds with the one shown on FIG. 1. A first (upper) and second (lower) pair of tracks is cut in a radially opposing manner in plane AA, while a second (upper) and a first (lower) pair of tracks is cut in a radially opposing manner in plane BB.

The individual depictions on FIG. 4 will be described together below. FIG. 4 is a monoblock joint like FIG. 3, but includes eights balls like the joint of FIG. 2. The same details as on FIG. 2 and FIG. 3 are labeled with the same reference numbers, and modified features are further indexed by 100. Reference is made to the corresponding description. Instead of a second opening 14 (FIG. 2), the joint outer part 212 here has a formed-on bottom 25 followed by a shaft journal 26. The joint otherwise largely corresponds to the one shown in FIG. 2. Two second pairs of tracks 120, 121 are cut in the plane AA in a respectively radially opposing manner, while two first pairs of tracks 118, 119 are cut in a radially opposing manner in plane BB.

Figures 3A, 3B:
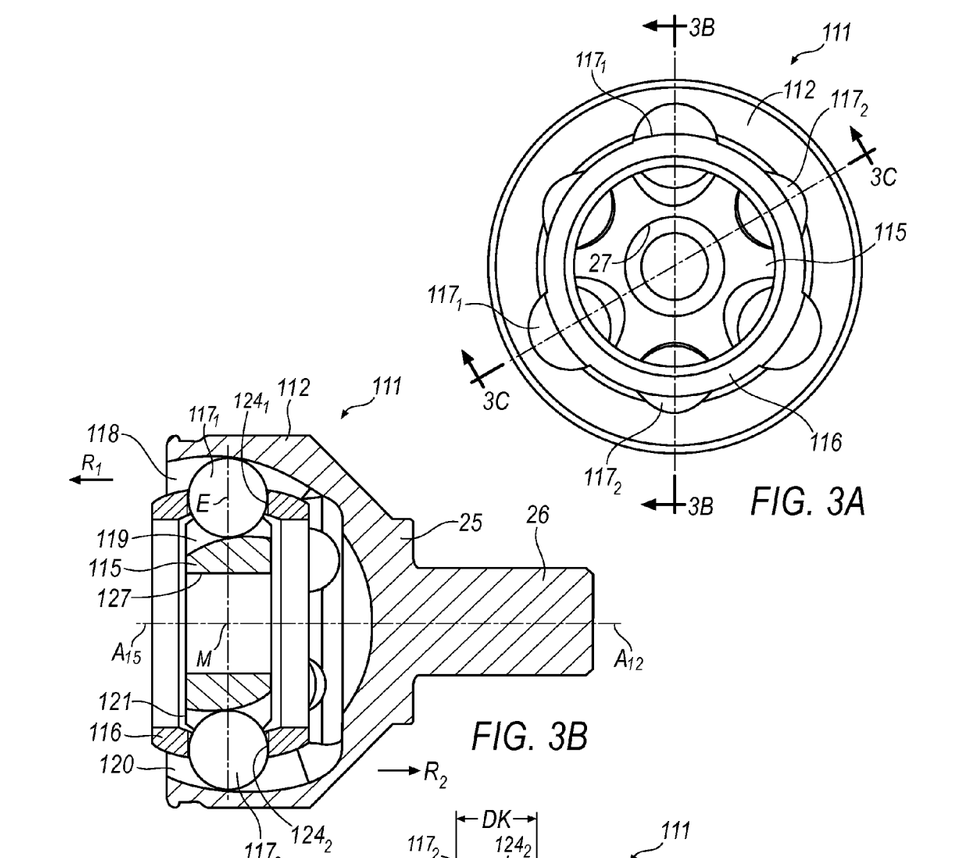
Figure 3C:
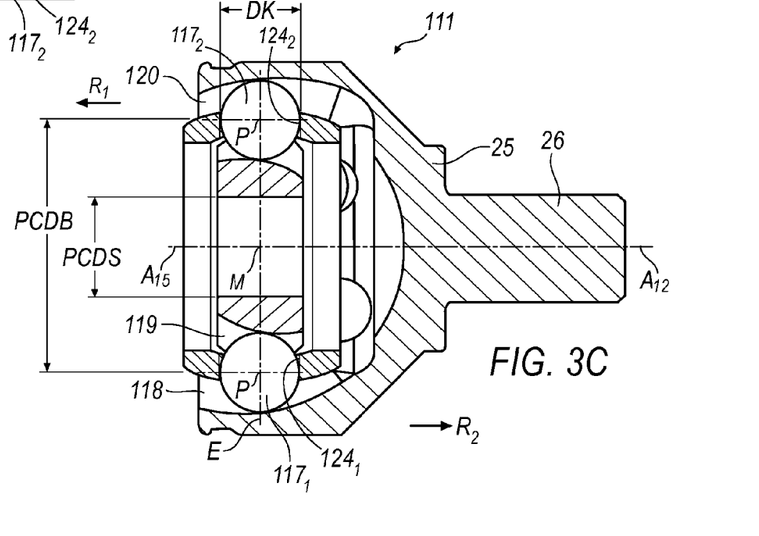
Figures 4A, 4B:
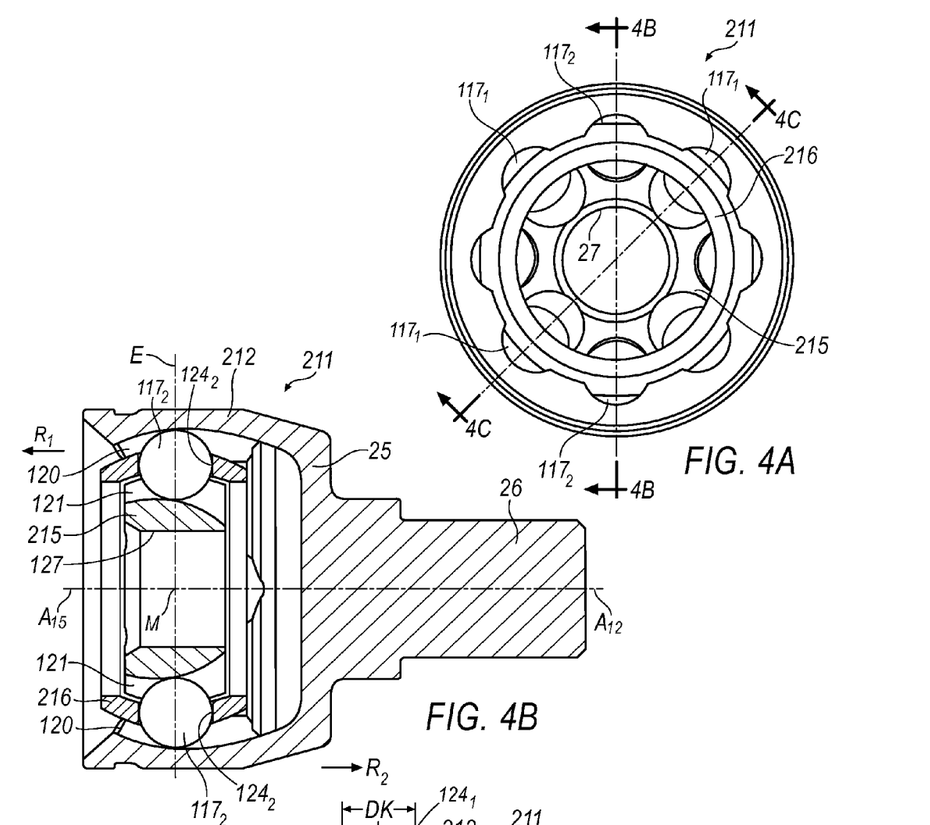
Figure 4C:
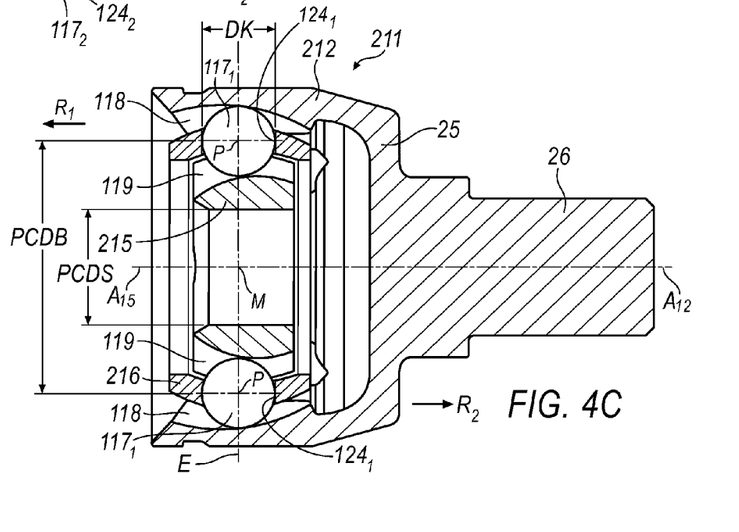
Figure 5:
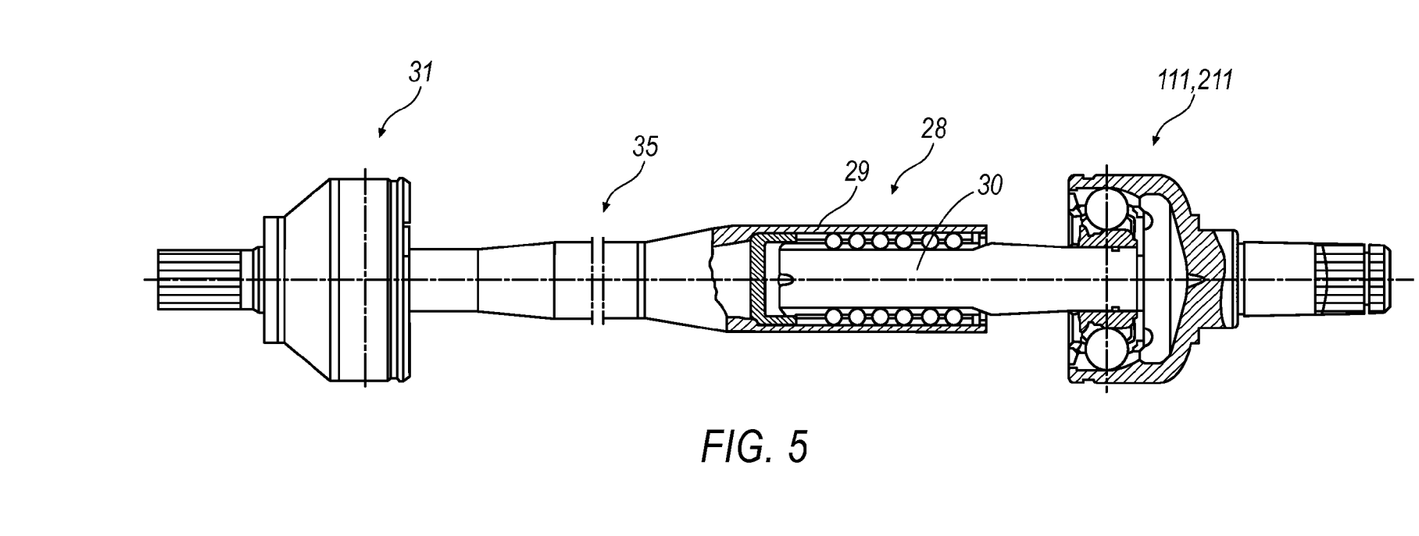
FIG. 5 shows a drive shaft according to an embodiment of the invention with at least one joint according to the invention and a plunging unit in partial longitudinal section.
Figure 9:
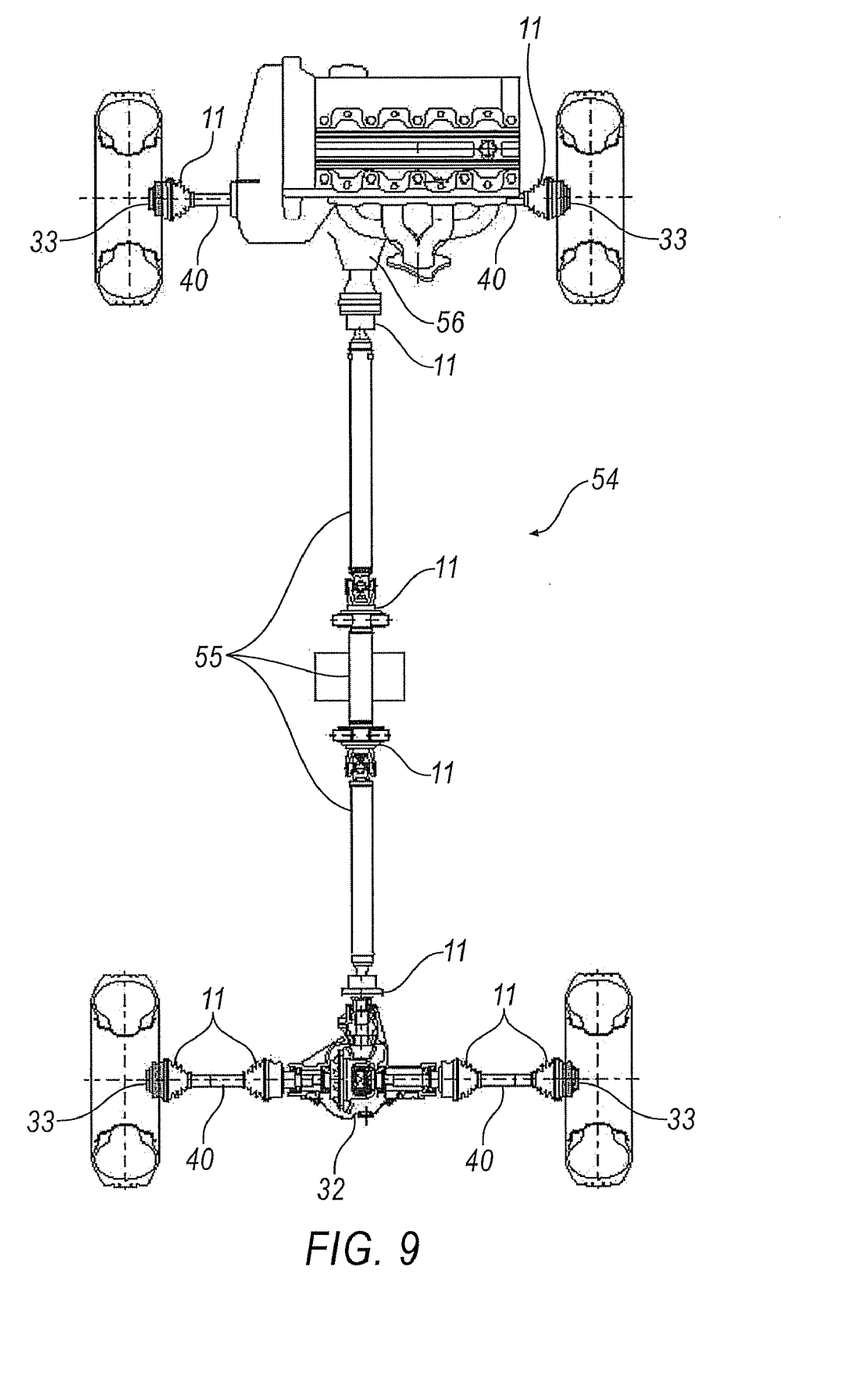
FIG. 9 illustrates a motor vehicle schematic, illustrating the side shafts, drive shafts, differential and drive unit. The joints (11, 111, 112 and 211) that are the subject of this disclosure are represented generically as joint 11.

FIG. 5 shows a drive shaft 55, illustrated in FIG. 9, that has a universal joint according to the invention as a monoblock joint based on one of FIG. 3 or 4, along with an intermediate shaft 35 and a second universal joint 31, which can also be a joint according to the invention, especially structurally identical with the joint 111, 211. The intermediate shaft 35 encompasses an axial plunging unit 28, which includes a sleeve 29, a journal 30 as well as torque-conveying balls active between the two and not denoted in specific detail as the essential components, and permits a longitudinal compensation of the drive shaft 55 between the universal joints 111, 211 and 31.

Figure 6:
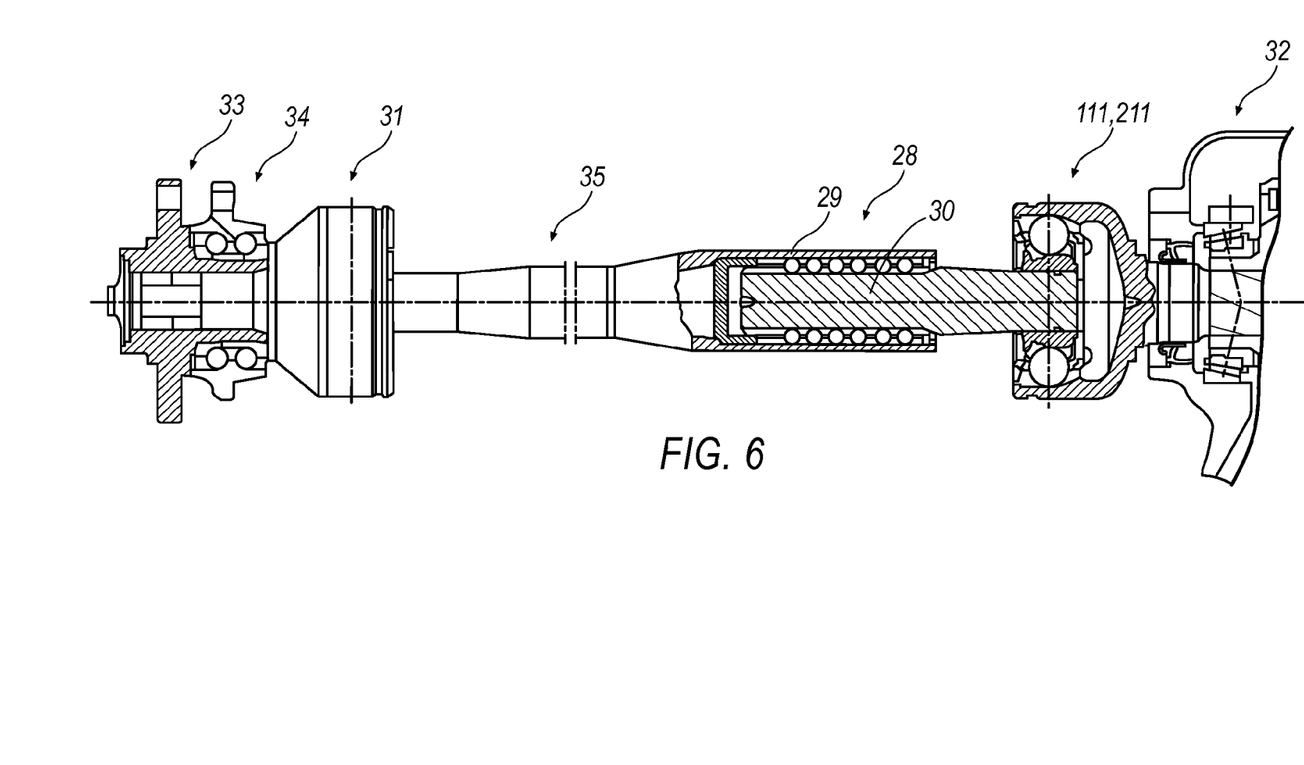
FIG. 6 shows an installation scenario according to an embodiment of the invention for a drive shaft according to FIG. 5 in a motor vehicle in partial longitudinal section.

FIG. 6 shows a drive shaft 55 according to FIG. 5 installed as a side shaft 40 in a motor vehicle 54, illustrated in FIG. 9. The shaft journal of the joint 111, 211 according to the invention is inserted into a differential gear 32 and secured therein, while the shaft journal of the second fixed joint 31 is inserted into a wheel hub arrangement 33 with a wheel mount 34, the same details are marked with the same reference numbers as on FIG. 5.

Figure 1A:
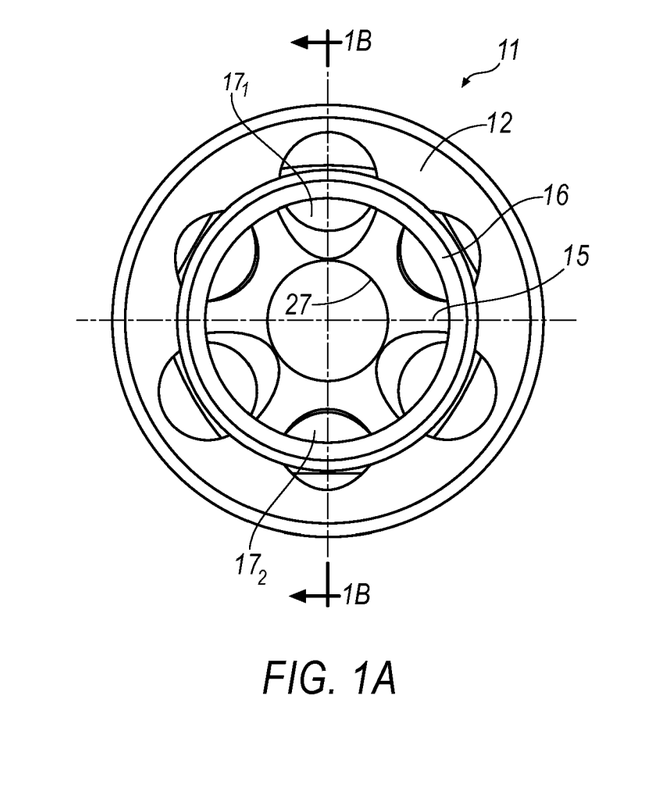
Figure 1B:
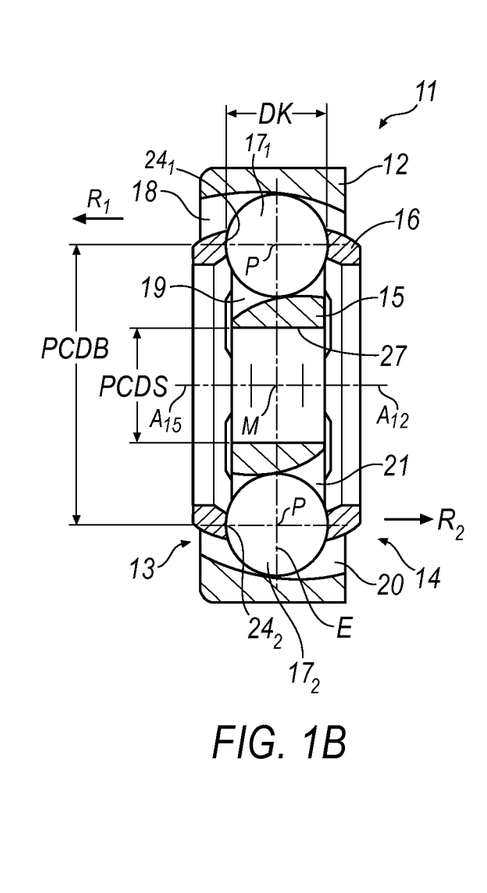
Figure 2A:
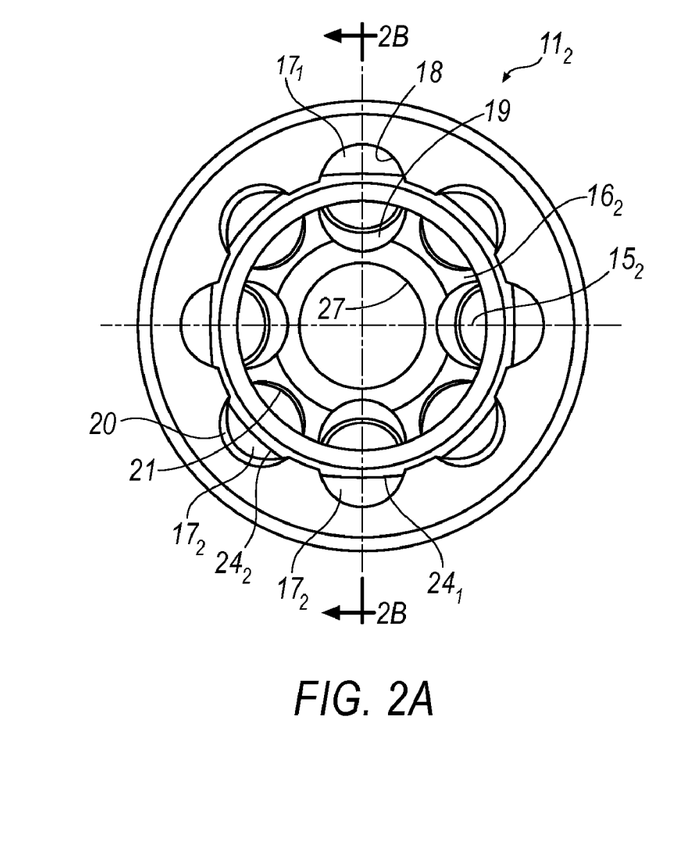
Figure 2B:
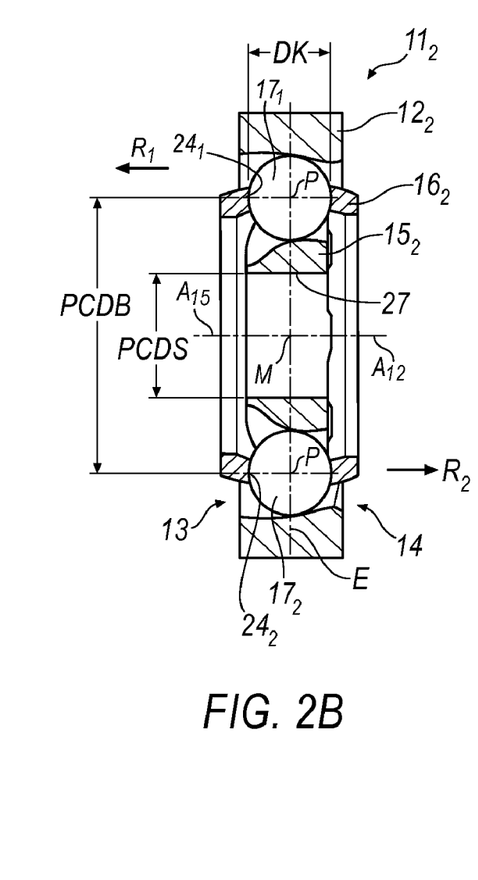
Figure 7:
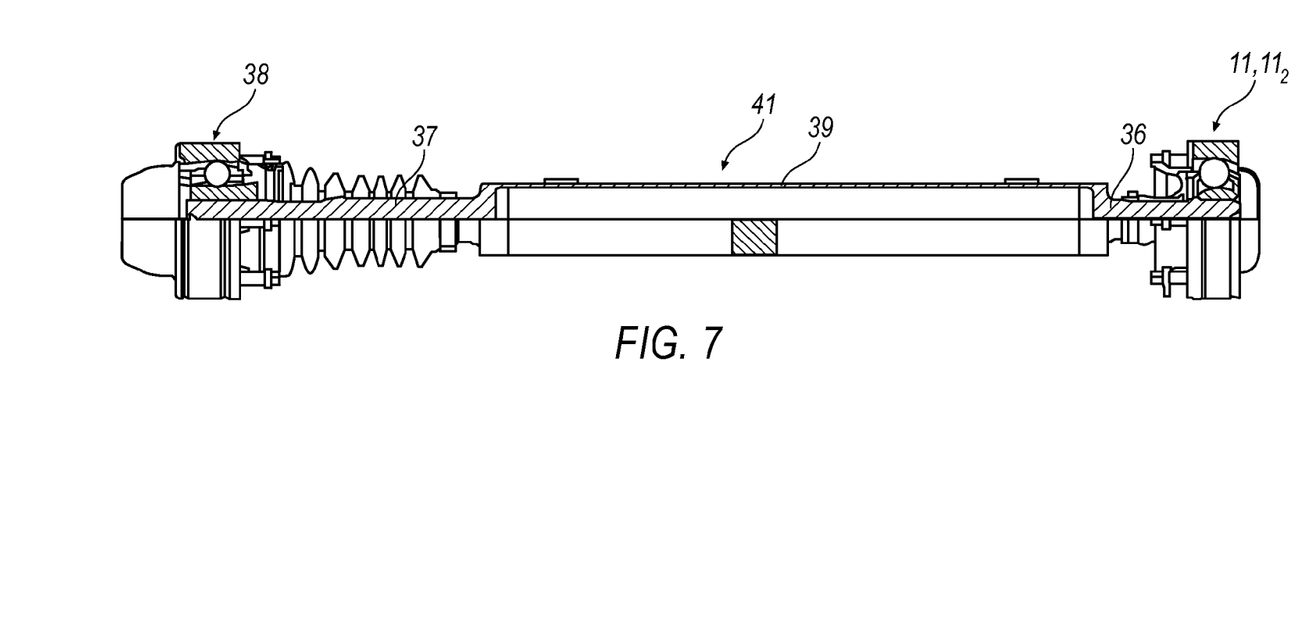
FIG. 7 shows a longitudinal drive shaft according to an embodiment of the invention with a fixed joint according to the invention and a plunging joint in longitudinal half section.

FIG. 7 shows a drive shaft 55, illustrated in FIG. 9, according to the invention with a joint 11, 112 according to the invention designed as a disc joint according to one of FIG. 1 or 2, which takes the form of a longitudinal drive shaft 55. An intermediate shaft 41 comprises a shaft tube 39 and two shaft journals 36, 37 welded thereto. The shaft journal 37 is connected with a plunging joint 38, in particular a so-called VL-joint. The shaft journal 36 is connected with the joint 11, 112 according to the invention.

Figure 8:
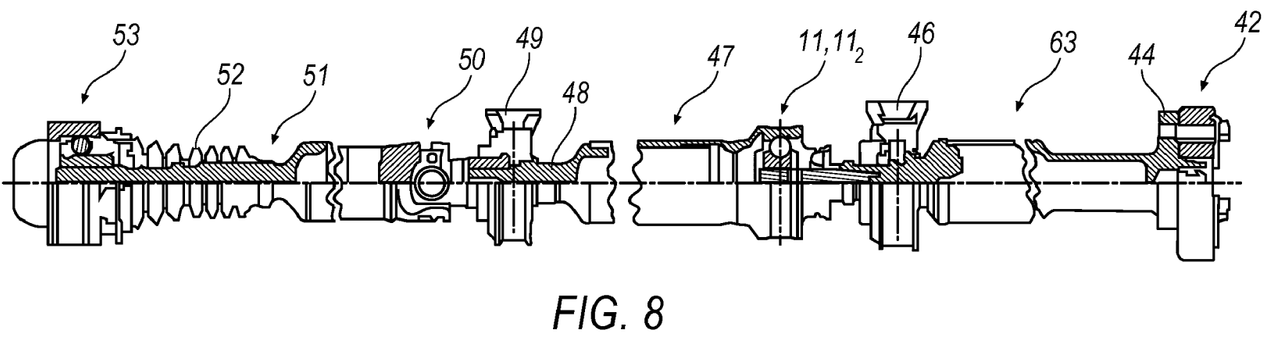
FIG. 8 shows a longitudinal drive shaft according to an embodiment of the invention with a fixed joint according to the invention as an intermediate joint, another universal joint as an intermediate joint, and a plunging joint in longitudinal half section.

FIG. 8 shows a cardan drive shaft 55, illustrated in FIG. 9, according to the invention with a joint 11, 112 according to the invention designed as a disc joint according to one of FIG. 1 or 2, which takes the form of a longitudinal drive shaft 55, and has a disc joint 42, an intermediate shaft 43 with a flange 44 and a journal 45 from right to left, along with an elastic intermediate bearing 46, wherein the joint 11, 112 is followed by another intermediate shaft 47 with a shaft journal 48, another intermediate bearing 49 and a universal joint 50; finally, there is another intermediate shaft 51 with shaft journals 52 connected with a universal plunging joint 53, in particular a VL-joint. Shafts of this kind are incorporated in the longitudinal drive train of motor vehicles 54 between a gearbox output 47 and a differential 32 input, illustrated in FIG. 9.

In each embodiment of the joints 11, 11$_2$, 111, 211, the ratio (V1) between the pitch circle diameter (PCDS) of the shaft splines in the joint inner part to the third power and the product of ball diameter (DK) squared and pitch circle diameter of the balls with aligned joint (PCDB) assumes a value of between 0.9 and 1.3, i.e., $$0.9 < V1 < 1.3 \text{ with } V1 = PCDS^3/(DK^2 - PCDB).$$

Alternatively or, in addition, the ratio (V3) between the pitch circle diameter of the shaft splines in the joint inner part (PCDS) and the OR factor lies between 0.34 and 0.37, wherein the OR factor is defined as the sum of the pitch circle diameter of the balls (PCDB) with aligned joint and the ball diameter (DK), so that $$0.34 < V3 < 0.37 \text{ with } V3 = PCDS/(PCDB + DK).$$

In combination with at least one of V1 or V3 being satisfied, the ratio (V2) between the IR factor and the OR factor measures between 0.525 and 0.585, wherein the IR factor is defined as the difference between the pitch circle diameter of the balls with aligned joint (PCDB) and the ball diameter (DK), and the OR factor is defined as the sum of the pitch circle diameter of the balls with aligned joint (PCDB) and the ball diameter (DK), so that $$0.525 < V2 < 0.585 \text{ with } V2 = (PCDB - DK)/(PCDB + DK).$$

Further in combination with at least one of V1 or V3 being satisfied, the ratio (V4) between the pitch circle diameter of the shaft splines in the joint inner part (PCDS) and the IR factor measures between 0.58 and 0.65, wherein the IR factor is defined as the difference between the pitch circle diameter of the balls with aligned joint (PCDB) and the ball diameter (DK), so that $$0.58 < V4 < 0.65 \text{ with } V4 = PCDS/(PCDB - DK).$$

For each embodiment, the joint can be configured wherein the articulation angle ranges from 25° to 45°, in particular from 30° to 40°.

The invention claimed is:

1. A constant velocity joint in the form of a counter track joint comprising:
    an outer joint part having a first longitudinal axis ($A_{12}$) and comprising first outer ball tracks and second outer ball tracks;
    an inner joint part having a second longitudinal axis ($A_{15}$) and comprising first inner ball tracks and second inner ball tracks;
    the first outer ball tracks and the first inner ball tracks form first pairs of tracks;
    the second outer ball tracks and the second inner ball tacks form second pairs of tracks;
    the pairs of tracks each accommodate a torque transmitting ball;
    a ball cage is positioned between the outer joint part and the inner joint part and comprises circumferentially distributed cage windows which each receive at least one of the balls;
    when the joint is in the aligned condition, the first pairs of tracks open in a central joint plane (E) in a first direction $R_1$, and
    when the joint is in the aligned condition, the second pairs of tracks open in the central joint plane (E) in a second direction $R_2$,
    wherein, when the joint is in the aligned condition, the following condition is satisfied:

$$0.9 < V1 < 1.3 \text{ with } V1 = PCDS^3/(DK^2 \times PCDB)$$

where PCDS is the pitch circle diameter of a shaft toothing in the inner joint part, DK is the ball diameter, and PCDB is the pitch circle diameter of the balls,
    wherein the joint is designed to have a maximum angle of articulation ranging between 30° and 40°.

2. A constant velocity joint according to claim 1, wherein the following is satisfied:

$0.525 < V2 < 0.585$ with $V2 = (PCDB-DK)/(PCDB+DK)$.

3. A constant velocity joint according to claim 1, wherein the following is satisfied:

$0.58 < V4 < 0.64$ with $V4 = PCDS/(PCDB-DK)$.

4. A constant velocity joint according to claim 1, wherein the first pairs of tracks and the second pairs of tracks are arranged so as to alternate across the circumference.

5. A constant velocity joint according to claim 1, wherein the joint comprises eight balls.

6. A constant velocity joint according to claim 1, wherein the outer joint part comprises a joint base formed on one side thereof, the base including a formed-on journal.

7. A driveshaft comprising two constant velocity joints and an intermediate shaft, wherein at least one of the constant velocity joints is a joint according to claim 1.

8. A driveshaft according to claim 7, wherein the intermediate shaft comprises an axial plunging unit.

9. A motor vehicle with at least two driveshafts which each comprise two constant velocity joints and an intermediate shaft and which each connect a differential drive to a wheel hub unit, wherein at least one of the joints is a joint according to claim 1, and a the shaft journal of same is inserted into the differential drive.

10. A motor vehicle with at least two driveshafts which each comprise two constant velocity joints and an intermediate shaft and which each connect a differential drive to a wheel hub unit, wherein at least one of the joints is a joint according to claim 1, and a journal of same is inserted into the wheel hub unit.

11. A motor vehicle with a driveshaft which comprises at least two constant velocity universal joints and an intermediate shaft wherein at least one of the constant velocity joints is a joint according to claim 1.

12. A motor vehicle according to claim 11, wherein the driveshaft comprises three intermediate shafts which are connected via constant velocity universal joints.

13. A motor vehicle according to claim 11, wherein at one end of the driveshaft there is arranged a constant velocity plunging joint.

14. A motor vehicle according to claim 11, wherein the driveshaft connects a gearbox output with a differential input.

15. A constant velocity joint in the form of a counter track joint comprising:
   an outer joint part having a first longitudinal axis ($A_{12}$) and comprising first outer ball tracks and second outer ball tracks;
   an inner joint part having a second longitudinal axis ($A_{15}$) and comprising first inner ball tracks and second inner ball tracks;
   the first outer ball tracks and the first inner ball tracks form first pairs of tracks;
   the second outer ball tracks and the second inner ball tacks form second pairs of tracks;
   the pairs of tracks each accommodate a torque transmitting ball;
   a ball cage is positioned between the outer joint part and the inner joint part and comprises circumferentially distributed cage windows which each receive at least one of the balls;
   when the joint is in the aligned condition, the first pairs of tracks open in a central joint plane (E) in a first direction $R_1$, and
   when the joint is in the aligned condition, the second pairs of tracks open in the central joint plane (E) in a second direction $R_2$,
   wherein, when the joint is aligned, the following is satisfied:

$0.34 < V3 < 0.37$ with $V3 = PCDS/(PCDB+DK)$ where PCDS is the pitch circle diameter of a shaft toothing in the inner joint part, PCDB is the pitch circle diameter PCDB of the balls, and DK is the ball diameter,
   wherein the joint is designed to have a maximum angle of articulation ranging between 30° and 40°.

16. A constant velocity joint according to claim 15, wherein the following is satisfied:

$0.525 < V2 < 0.585$ with $V2 = (PCDB-DK)/(PCDB+DK)$.

17. A constant velocity joint according to claim 15, wherein the following is satisfied:

$0.58 < V4 < 0.64$ with $V4 = PCDS/(PCDB-DK)$.

18. A constant velocity joint according to claim 15, wherein the first pairs of tracks and the second pairs of tracks are arranged so as to alternate across the circumference.

19. A constant velocity joint according to claim 15, wherein the joint comprises eight balls.

20. A constant velocity joint according to claim 15, wherein the outer joint part comprises a joint base formed on one side thereof, the base including a formed-on journal.

21. A driveshaft comprising two constant velocity joints and an intermediate shaft, wherein at least one of the constant velocity joints is a joint according to claim 15.

22. A driveshaft according to claim 21, wherein the intermediate shaft comprises an axial plunging unit.

23. A motor vehicle with at least two driveshafts which each comprise two constant velocity joints and an intermediate shaft and which each connect a differential drive to a wheel hub unit, wherein at least one of the joints is a joint according to claim 15, and a the shaft journal of same is inserted into the differential drive.

24. A motor vehicle with at least two driveshafts which each comprise two constant velocity joints and an intermediate shaft and which each connect a differential drive to a wheel hub unit, wherein at least one of the joints is a joint according to claim 15, and a journal of same is inserted into the wheel hub unit.

25. A motor vehicle with a driveshaft which comprises at least two constant velocity universal joints and an intermediate shaft wherein at least one of the constant velocity joints is a joint according to claim 15.

26. A motor vehicle according to claim 25, wherein the driveshaft comprises three intermediate shafts which are connected via constant velocity universal joints.

27. A motor vehicle according to claim 25, wherein at one end of the driveshaft there is arranged a constant velocity plunging joint.

28. A motor vehicle according to claim 25, wherein the driveshaft connects a gearbox output with a differential input.

* * * * *